United States Patent [19]

Streeter

[11] 4,068,386
[45] Jan. 17, 1978

[54] LINE LEVEL

[76] Inventor: Walter E. Streeter, 3161 NW. 108th Drive, Coral Springs, Fla. 33065

[21] Appl. No.: 764,593

[22] Filed: Feb. 1, 1977

Related U.S. Application Data

[63] Continuation-in-part of Ser. No. 713,187, Aug. 10, 1976.

[51] Int. Cl.² ............................................. G01C 9/28
[52] U.S. Cl. ...................................................... 33/369
[58] Field of Search ......................................... 33/369

[56] References Cited

U.S. PATENT DOCUMENTS

| 2,014,709 | 9/1935 | Volz | 33/369 |
| 3,878,617 | 4/1975 | West et al. | 33/369 |

OTHER PUBLICATIONS

Bronson Sonic Power Co., Ultrasonic News, July 1972.
Bronson Sonic Power Co., Ultrasonic News, Feb. 1973.

Primary Examiner—Charles E. Phillips
Attorney, Agent, or Firm—Charles L. Lovercheck

[57] ABSTRACT

A line level made of two substantially identical halves molded from thermoplastic material. Each half has an internal surface in the shape of a part of a cylinder which co-operates with a like surface on the other half to receive an end of a level vial. The ends of each half are rectangular and a cylindrical level vial is sandwiched between the halves with its ends resting on the internal cylindrical surfaces. Each half has an outer rectangular surface and a pintle extending inwardly on one end and a hollow boss on the other end which receives the pintle on the other half. An energy director is formed on the one half on the edges that engage the other part for ultrasonically welding the parts together.

3 Claims, 5 Drawing Figures

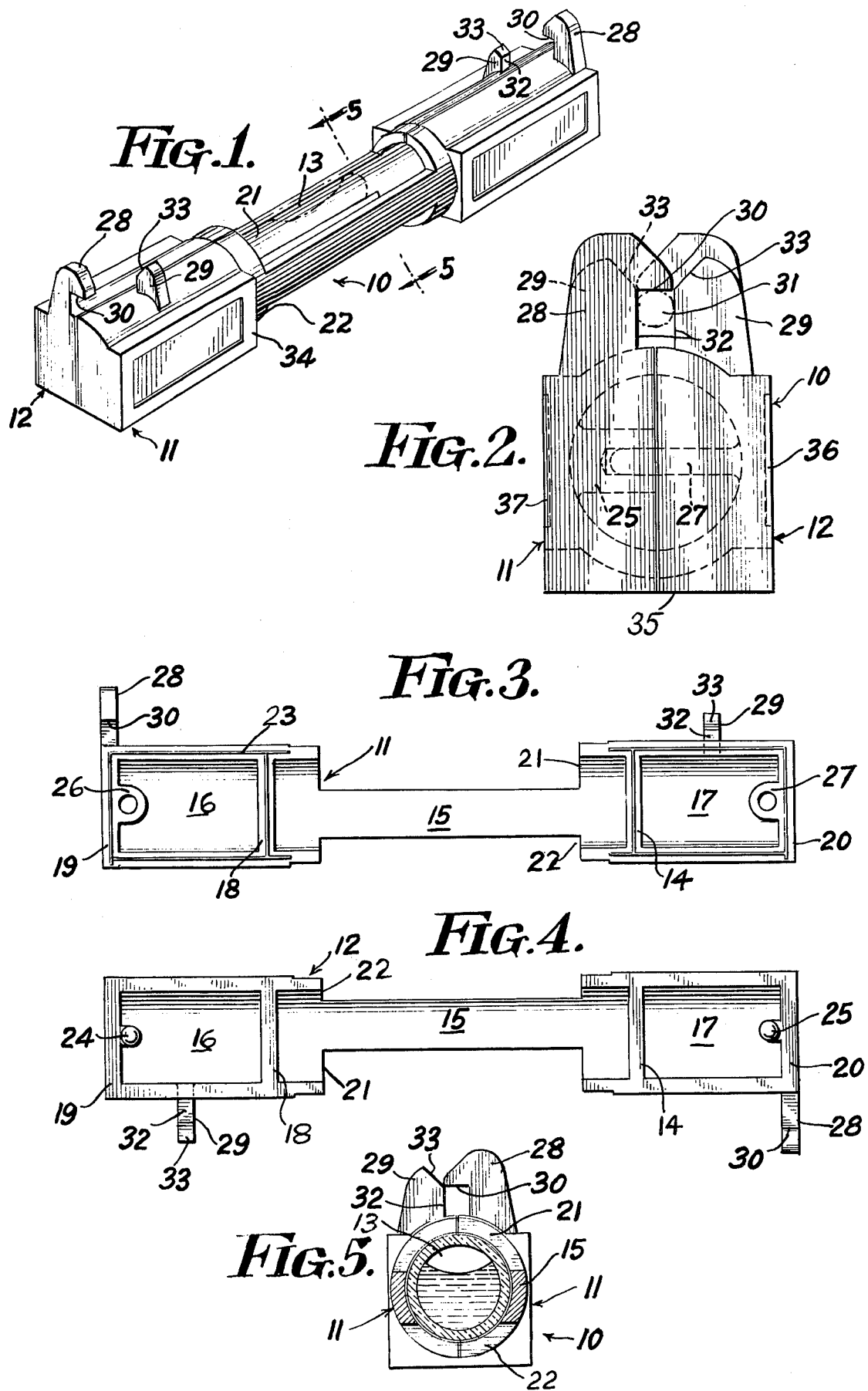

LINE LEVEL

REFERENCE TO PRIOR APPLICATION

This application is a continuation in part of U.S. Patent application Ser. No. 713,187 to Walter Streeter filed Aug. 10, 1976.

OBJECTS OF THE INVENTION

It is an object of the invention to provide an improved line level.

Another object of the invention is to provide a line level that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 1 is an isometric view of the line level according to the invention.

FIG. 2 is an end view of the line level.

FIG. 3 is a side view of the inside of one half of the line level.

FIG. 4 is an inside view of the other half of the line level.

FIG. 5 is a cross-sectional view taken on line 5—5 of FIG. 1.

DETAILED DECRIPTION OF DRAWINGS

Now, with more particular reference to the drawings, the line level has a body 10 made up of two substantially identical half cylindrical members 11 and 12 and a cylindrical level vial 13 sandwiched between the halves 11 and 12.

Each half 11 and 12 has an integral half cylindrical member 16 and 17 at each end and an intermediate cylindrical member 15. The cylindrical members 16 and 17 are separated by partitions 14 and 18 from the intermediate cylindrical member 15. The ends of the half cylindrical members are closed by the end members 19 and 20 defining a generally rectangular out surface portion.

The half cylindrical members 16 and 17 are a continuation of the intermediate cylindrical member 15 which joins the members 16 and 17.

The intermediate member 15 on each half 11 and 12 of the body 10 has an upper notch 21 and lower notch 22 defining intermediate openings through which the level vial is exposed as shown in FIG. 1. Pintles 24 and 25 are molded onto the end members 19 and 20 of body half 12 and bosses 26 and 27 are molded onto the end members 19 and 20 of the body half 11. The body half 11 also has energy director fins 23 molded onto the surface which engages the corresponding surface of the other body half 12 when the halves are put together in a manner familiar to those skilled in the art. The hooks 28 are formed integral with the end members 19 and 20 and extend upwardly therefrom, and the stops 29 are molded integral with the body halves 11 and 12 and extend upwardly therefrom. The hooks 28 have a downwardly facing surface 30 which overlies the line 31 when in use and the vertical surface 32 on the stop 29 prevents the line 31 from slipping out from under the surface 30. The stop 29 likewise has an inclined top surface 33 that prevents the line 31 from sliding away from the hooks 28 when the line level 10 is being attached to the line 31.

The half cylindrical members 16 and 17 have flat external sides 34 and lower flat surfaces 35 on which the body can rest when used on a flat surface.

When the two halves 11 and 12 are put together as shown in FIG. 1 and exposed to ultrasonic welding technique, the two halves are fused together with the pintles 24 and 25 received in the hollow bosses 26 and 27.

The foregoing specification sets forth the ivention in its preferred, practical forms but the structure shown is capable of modification within a range of equivalents without departing from the invention which is to be understood is boradly novel as is commensurate with the appended claims.

The embodiments of the invention in which an exclusive property or privilege is claimed are defined as follows:

1. A line level consisting of a first half and a second half each having a mating inner surface each said half consisting of a first end portion, an intermediate portion, and a second end portion, said first half and said second half in said intermediate portion having a curved inner surface in the shape of a part of a circular cylinder, said first end portion and said intermediate portion are defined by a first partition, and said second end portion and said intermediate portion are defined by a second partition, a level vial is disposed between said first half and said second half in said intermediate portion, said level vial resting between said first portion and said second partition, and between said curved inner surfaces of the said intermediate portions of said first half and said second half, said first end portion and said second end portion of said first half and said second half having flat outer surfaces on the bottom and outer sides thereof, said first and second portions have an outer surface portion defining a generally rectangular shape, at least one of said halves having an energy director flange formed on the inner surface for ultrasonic welding of said halves together, and a hook formed on one said end of said first half and a stop formed on the other said end of said first half and a hook and a stop formed on the opposite end portions of said second half whereby said line level can be supported on a line between said hooks and said stops, a first viewing port formed in the upper surface of each said half at said intermediate portion and a second viewing port formed in the lower surface of each said half at said intermediate portion.

2. The line level recited in claim 1 wherein said hooks have a flat, downwardly facing surface parallel to said bottom surface.

3. The line level recited in claim 1 wherein one half has a pintle on one end thereof adapted to be received in a hollow boss in the other half.

* * * * *